March 20, 1928.
C. R. LAUBSCHER
1,663,053
FOLDING EYEGLASSES
Filed Jan. 27, 1927
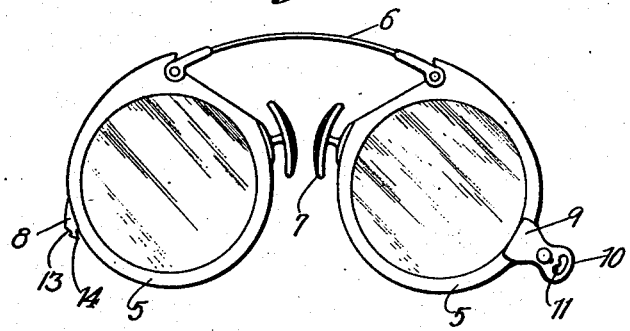
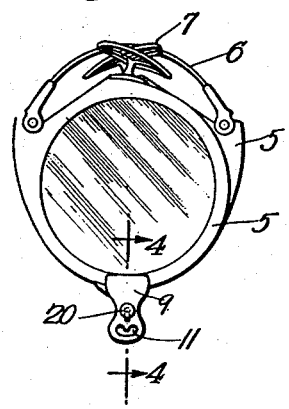
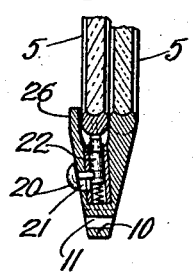
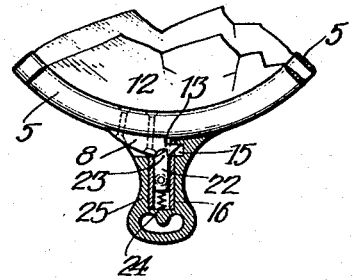
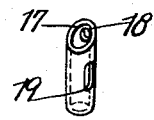
Inventor
CHARLES R. LAUBSCHER.
By His Attorney
Richard B. Owen Patented Mar. 20, 1928.

1,663,053

UNITED STATES PATENT OFFICE.

CHARLES R. LAUBSCHER, OF RICHMOND HILL, NEW YORK.

FOLDING EYEGLASSES.

Application filed January 27, 1927. Serial No. 164,042.

This invention relates to eyeglasses and in particular to the so-called oxford type.

In the folding type of eyeglasses, commonly known as the oxford glasses, the lenses are held in suitable frames which are pivotally associated with a flexible bridge so that the lenses may be held in superposed relation when folded, there being provided suitable catching means for holding the lenses or spectacles in their folded position.

One of the important objects of my invention is to provide a locking or latching means whereby the glasses may be retained in their folded position so that jars or shaking movements given the glasses when in their folded position will not tend to release the latching means so that the glasses will become unfolded, thus causing an annoyance to the person using the glasses by reason of their unfolding in the pocket or at times when their use is not desired.

A particular object of my invention is to provide a latching member and a housing for the same which will be provided in such a manner that protection will be afforded the material making up the glass frame, which is usually of zylonite and does not resist wear very readily.

To enable others skilled in the art to fully comprehend the underlying features of my invention that they may embody the same in the various modifications in structure and relation contemplated, a drawing depicting a preferred form has been annexed as a part of this disclosure and in such drawings, similar reference characters denote corresponding parts throughout all the views, of which, Figure 1 is a view in rear elevation of the eyeglasses as they would appear to the person about to place them in position on the nose.

Figure 2 is a rear view of the glasses in their folded position.

Figure 3 is an enlarged, fragmentary view of the eyeglasses in their folded position, the folding means being shown in the handle piece of the glasses, which is shown in section.

Figure 4 is an enlarged view taken on the lines 4—4 of Figure 2 showing the location of the latch pin in the handle piece of the eyeglasses, and Figure 5 is an enlarged view in perspective of the sleeve used in conjunction with the handle piece to afford a seat for the hook member and to form a housing for the latch.

Referring to the drawings in detail, 5 indicates the lens frames which are made of zylonite or other celluloid-like material, which are joined by the flexible bridge 6 and carry the opposed nose engaging members 7. The opposite sides of the lens frames 5 carry the hook 8 and the handle piece 9, the latter of which is formed integrally with the frame 5 and is shaped to provide a handle piece 10, through the medium of which the glasses may be positioned upon the nose or may be held when not in use, there being provided an opening 11 through the handle piece 10 through which may be passed a cord or ribbon, whereby the eyeglasses may be suspended from the neck of the wearer or otherwise attached to the clothing of the person.

Heretofore, the handle piece 9 has been provided with an internal bore in which has been positioned an operating latch 22, which engages the hook carried on the opposite frame member 5. The operation of this latch pin in the bore in the zylonite has increased the diameter thereof due to wear with the result that the hook was not held securely by the latch with the result that any slight jar or movement given the folded eyeglasses would result in the detachment of the hook from the latch pin and the opening of the eyeglasses to their full position as shown in Figure 1, and in this latter instance, use was made of a pin which was passed through the handle piece 9 and which showed, on the front side of the glasses, thereby rendering the same unsightly and also presenting an objection to its use by becoming loose and allowing the hook 8 to be easily released. The hook is provided in the opposite frame piece from that carrying the handle piece and is secured therein through the suitable rivet 12, the hook itself providing a notch 13 in its outer face and its point 14 being slightly spaced from the frame 5 so that the hook portion 14 may pass into the bore 15 provided in the handle piece 9 of the zylonite frame. Heretofore, this bore 15 in the zylonite frame became worn allowing the under notch 13 in the hook 8 to become readily detached from the latch and in order to provide against this, I have placed within the handle piece, after suitably boring the same, the sleeve 16, which is made from a short piece of tubing cut obliquely on one end as at 17 and provided with a small opening 18, adjacent that end. In the side of the sleeve in its mid section and substantially at right angles to the opening 18, I provide an elongated slot 19 which accommodates the latch operating pin 20, the opening 19 coinciding with a slot 21 cut in the zylonite handle piece 9, arranged to accommodate also the latch pin 20 above referred to, which is provided with an enlarged head which covers the slot 21 so that no unsightly appearance is presented. The latch pin 20 is secured in the latch 22, the end of which is pointed as at 23 and arranged to engage the cut-out portion 13 of the hook 8 to retain the eyeglasses in their folded position, when the hook has passed through the opening 18 in the sleeve 17 and is engaged by the latch. The latch is normally urged outward by the spring 24 which bears against the bottom wall of the bore 25 provided in the handle piece 9 and into which the sleeve 17 is forcibly fitted, the same being retained in position therein so that the obliquely cut end thereof will allow passage of the hook member therethrough and through the opening 18 in the side of said sleeve.

With this arrangement, it will be evident that the hole 18 in the sleeve will prevent wear of the zylonite bore 15 by taking up any wear of the hook and preventing enlargement of the hole 18, it of course being understood that the sleeve is made of any suitable metal which may be hardened, if desired, and which is so positioned in the zylonite handle piece 9 that it also allows sliding movement of the latch 22 without wearing the zylonite bore.

Heretofore this latch has been operated in a bore cut directly in the zylonite with the result that continuous sliding of the latch caused wear to the zylonite. This objection has been overcome by the inclusion of the sleeve 17 which serves the double purpose of preventing wear of the bore accommodating the latch and also in the bore accommodating the end of the hook and against which the hook is pressed by reason of the action of the spring 24 against the latch member which is normally urged outwardly but which is limited in its movement by the latch pin 20.

It is evident that when the glasses are to be folded up, the frame, bearing the hook member 8 is drawn around against the action of the spring bridge 6 until the hook 8 passes into the opening provided by the overhanging portion 26 of the handle piece 9 and when the notched under side 13 of the hook 8 passes over the end of the latch 22, the hook is retained in position in the bore 15 of the handle piece and due to the action of the latch 22, the end 14 of the hook is forced against the peripheral edge of the opening 18 in the sleeve 17 and is thereby forcibly held in locked position until a movement of the latch pin 20 draws back the latch 22 to release the hook 8 and allow the bridge 6 to open the glasses to the position shown in Figure 1.

It will be evident, therefore, that I have provided a new and improved feature in the oxford style of folding eyeglasses which contemplates the use of a metallic sleeve embedded in the projected portion of one of the lens holding frame members whereby the latch and hook used in maintaining the eyeglasses in folded position, will not cause wear to the relatively soft celluloid or zylonite, as used in eyeglass construction.

It is evident also that I have provided an inexpensive method of reinforcing the handle piece and one which will prevent the bores therein that accommodate the holding members from becoming worn whereby slight jars or other movements of a non-intentional character will not allow the glasses to open when not needed.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit of the invention or the scope of the appended claims.

Having thus described my invention, what I claim as new and desire to secure by United States Letters Patent is:—

1. Folding eyeglasses comprising lens holding frames, a handle piece on one of the frames having a plurality of bores therein, a sleeve in one of said bores having an opening therein arranged to coincide with the other bore, a hook on the other frame, the hook being arranged to extend through the opening in said sleeve and into the adjacent bore and a latch for retaining the hook in said opening.

2. Folding eyeglasses comprising lens holding frames, a handle piece on one of the frames having a hook receiving bore therein, a sleeve in said handle piece having an opening therein arranged to coincide with said bore, a hook on the other frame, the hook being arranged to extend through the opening in said sleeve and into said bore and a latch in said sleeve for engaging the hook whereby the same is retained in the opening in said sleeve and in the bore of said handle piece, and said sleeve opening being disposed at the edge of and in alignment with said bore.

In testimony whereof I affix my signature.

CHARLES R. LAUBSCHER. [L. S.]